United States Patent
Park et al.

(10) Patent No.: US 9,943,777 B2
(45) Date of Patent: Apr. 17, 2018

(54) SEPARATOR

(71) Applicant: HANWHA TECHWIN CO., LTD., Changwon-si (KR)

(72) Inventors: Hoyoul Park, Changwon-si (KR); Honggi Park, Changwon-si (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 186 days.

(21) Appl. No.: 14/695,477

(22) Filed: Apr. 24, 2015

(65) Prior Publication Data

US 2016/0023127 A1    Jan. 28, 2016

(30) Foreign Application Priority Data

Jul. 25, 2014  (KR) .................. 10-2014-0095001

(51) Int. Cl.
*F28B 3/00* (2006.01)
*B01D 5/00* (2006.01)
*B01D 53/26* (2006.01)

(52) U.S. Cl.
CPC ........... *B01D 5/0003* (2013.01); *B01D 5/009* (2013.01); *B01D 53/265* (2013.01)

(58) Field of Classification Search
CPC ..... B01D 5/0003; B01D 53/265; B01D 5/009
USPC .................... 165/110, 111, 112, 113, 114
See application file for complete search history.

(56) References Cited

U.S. PATENT DOCUMENTS

| | | | | |
|---|---|---|---|---|
| 10,813 A * | 4/1854 | Stafford | .................... | F28B 1/02 165/111 |
| 888,637 A * | 5/1908 | Morison | .................... | F28B 1/02 165/109.1 |
| 1,233,138 A * | 7/1917 | Snow | .................... | F28B 1/02 165/114 |
| 1,855,390 A * | 4/1932 | Ehrhart | .................... | F28B 1/02 165/113 |
| 2,830,797 A * | 4/1958 | Garland | .................... | F25B 39/04 165/110 |
| 2,919,903 A * | 1/1960 | Vautrain | .................... | F28D 7/1646 165/110 |
| 3,048,373 A * | 8/1962 | Bauer | .................... | B01D 3/32 122/32 |

(Continued)

FOREIGN PATENT DOCUMENTS

EP    0101555 A2    2/1984
EP    1464887 A1    10/2004

(Continued)

OTHER PUBLICATIONS

Communication dated Dec. 3, 2015, issued by the European Patent Office in counterpart European Application No. 15176414.9.

*Primary Examiner* — Claire Rojohn, III
(74) *Attorney, Agent, or Firm* — Sughrue Mion, PLLC

(57) ABSTRACT

Provided is a separator including: a first header into which gas flows from an exterior of the separator; a core connected to the first header and including at least one flow path configured to cool the gas flowing from the first header through the flow path; and a second header connected to the core and configured to guide the gas passing through the at least one flow path to the exterior of the separator, wherein the second header includes at least one first baffle provided on an inner wall of the second header and configured to remove moisture from the gas.

14 Claims, 4 Drawing Sheets

(56) References Cited

U.S. PATENT DOCUMENTS

| | | | | |
|---|---|---|---|---|
| 3,254,707 | A * | 6/1966 | Ferguson | F28F 9/0231 165/104.32 |
| 3,282,333 | A * | 11/1966 | Jensen | F28F 9/0231 165/111 |
| 3,338,052 | A * | 8/1967 | Holden | F01K 11/02 165/114 |
| 3,455,377 | A * | 7/1969 | Hayes | F28F 9/0231 123/41.54 |
| 3,541,807 | A * | 11/1970 | Henderson | B01D 53/26 55/490.2 |
| 3,698,476 | A * | 10/1972 | Wyzalek | F28B 1/02 165/112 |
| 3,989,103 | A * | 11/1976 | Cieszko | F28F 9/0231 123/41.54 |
| 4,002,442 | A * | 1/1977 | Merz | F28F 9/0231 123/41.54 |
| 4,193,443 | A * | 3/1980 | Nanaumi | B01D 53/265 165/110 |
| 4,249,596 | A * | 2/1981 | Tutak | B01D 5/0009 165/113 |
| 4,487,618 | A * | 12/1984 | Mann | B01D 46/0012 55/323 |
| 4,736,713 | A * | 4/1988 | Roarty | F28F 9/0278 122/235.17 |
| 5,011,519 | A * | 4/1991 | Maeda | B01D 46/0012 55/323 |
| 5,275,233 | A * | 1/1994 | Little | B01D 53/265 165/111 |
| 5,377,489 | A * | 1/1995 | Silvestri, Jr. | F01K 7/40 165/113 |
| 5,385,592 | A * | 1/1995 | Maeda | B01D 46/0023 55/323 |
| 5,509,466 | A * | 4/1996 | McQuade | F25B 39/04 165/112 |
| RE35,433 | E * | 1/1997 | Alexander, III | B01D 46/0023 55/431 |
| 5,765,629 | A * | 6/1998 | Goldsmith | F28B 1/06 165/111 |
| 5,893,408 | A * | 4/1999 | Stark | F24F 3/14 165/100 |
| 6,095,238 | A * | 8/2000 | Kawano | F22D 1/32 165/113 |
| 6,101,823 | A * | 8/2000 | Chiu | F24F 1/42 165/113 |
| 6,196,303 | B1 * | 3/2001 | Hepper | F24F 1/0007 165/111 |
| 6,332,494 | B1 * | 12/2001 | Bodas | F28B 1/06 165/111 |
| 6,488,745 | B2 * | 12/2002 | Gu | B01D 8/00 55/434.4 |
| 7,121,102 | B2 * | 10/2006 | Fijas | B01D 53/265 62/513 |
| 7,261,069 | B2 * | 8/2007 | Gunther | F01P 11/028 123/41.54 |
| 7,621,150 | B2 * | 11/2009 | Kadle | F25B 9/008 165/140 |
| 7,954,542 | B2 * | 6/2011 | Janssens | B01D 5/009 165/113 |
| 8,968,446 | B1 * | 3/2015 | Mainiero | F01M 13/04 95/287 |
| 9,016,354 | B2 * | 4/2015 | Hiraoka | F02C 7/143 165/110 |
| 9,212,836 | B2 * | 12/2015 | Welch | F25B 39/04 |
| 9,395,094 | B2 * | 7/2016 | Favero | F25D 21/14 |
| 2002/0084063 | A1 * | 7/2002 | Gawthrop | F25B 39/04 165/110 |
| 2009/0283247 | A1 * | 11/2009 | Aung | F25B 39/022 165/178 |
| 2011/0100594 | A1 * | 5/2011 | Galus | F24F 13/222 165/59 |
| 2012/0131891 | A1 * | 5/2012 | Nishiura | F22B 37/30 55/423 |
| 2016/0016110 | A1 * | 1/2016 | Munoz Segura | B01D 46/003 122/492 |

FOREIGN PATENT DOCUMENTS

| | | |
|---|---|---|
| JP | 2009-162429 A | 7/2009 |
| KR | 10-2012-0019427 A | 3/2012 |
| KR | 10-2013-0126118 A | 11/2013 |
| WO | 2005/075057 A1 | 8/2005 |

* cited by examiner

SEPARATOR

CROSS-REFERENCE TO RELATED APPLICATION

This application claims priority from Korean Patent Application No. 10-2014-0095001, filed on Jul. 25, 2014, in the Korean Intellectual Property Office, the disclosure of which is incorporated herein by reference in its entirety.

BACKGROUND

1. Field

Apparatuses consistent with exemplary embodiments relate to an apparatus, and more particularly, to a separator.

2. Description of the Related Art

The durability and operational efficiency of an apparatus using gas as a fuel, such as a multistage compressor, a turbine, or a gas turbine, may be improved by efficiently removing moisture from the gas. The moisture included in the gas may be removed by providing a separator in an area where the gas flows into the apparatus. Also, the separator may be used to condense and extract the moisture from the flowing gas and supply dry gas to the apparatus described above. The gas passing through the separator may have a differential pressure. In addition, a size and volume of the separator may have to be increased to improve the separation efficiency according to the type of the apparatus. Also, a large separator with an increased size and volume may be heavy and require a high manufacturing cost. Therefore, it is important to efficiently manufacture and reduce the size of the separator.

SUMMARY

One or more exemplary embodiments include a separator designed to improve the separation efficiency without increasing the size and the weight of the separator.

Additional aspects will be set forth in part in the description which follows and, in part, will be apparent from the description, or may be learned by practice of the presented exemplary embodiments.

According to an aspect of an exemplary embodiment, there is provided a separator including a first header into which gas flows from the outside, a core connected to the first header and including at least one flow path through which the gas flows from the first header and cools, and a second header connected to the core and guiding the gas which passes through the at least one flow path to the outside. At least one first baffle is provided on an inner wall of the second header to remove moisture from the gas.

According to an aspect of an exemplary embodiment, there is provided a separator including a first header into which gas flows from an exterior of the separator; a core connected to the first header and including at least one flow path configured to cool the gas flowing from the first header through the flow path; and a second header connected to the core and configured to guide the gas passing through the flow path to the exterior of the separator, wherein the second header includes a first baffle provided on an inner wall of the second header and configured to remove moisture from the gas.

The second header may include a second body unit that is open on one side and has an inner space in which the at least one first baffle is formed, and a condensate receiver connected to the second body unit and configured to accumulate condensate in a certain area.

The second header may include: a second body including: an opening provided on a first side of the second header; and the at least one first baffle provided on a second side of the second header; and a condensate receiver connected to the second body and configured to accumulate condensate in an area.

The second header may include a blocking plate provided inside the second header.

The separator may further include a second baffle provided on the blocking plate.

The second baffle may be configured to remove the moisture from the gas.

The second baffle may be configured to reduce a moving speed of the gas.

The blocking plate may be inclined with respect to a gas flowing direction.

The blocking plate may be inclined a distance between the blocking plate and a bottom portion of the second header increases with respect to the gas flowing direction.

At least a portion of the second baffle may be bent.

The first baffle may be configured to reduce a moving speed of the gas.

The first baffle may have at least one bending portion.

The second header may include a condensate guide unit that guides condensate in the second header.

The separator may further include a flow controlling unit provided on the condensate guide unit and opens or closes the condensate guide unit.

The condensate guide unit may be connected to a portion of the second header adjacent to an outlet of the second header.

A bottom portion of the second header may be inclined.

The at least one first baffle may include a protrusion protruding from the inner wall of the second header and extending from an upstream side of a flow direction to a downstream side of the flow direction.

The protrusion may include at least one of a U-shape, W-shape and a V-shape.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

The inventive concept will now be described more fully with reference to the accompanying drawings, in which exemplary embodiments of the inventive concept are shown. The inventive concept may, however, be embodied in many different forms and should not be construed as being limited to the exemplary embodiments set forth herein; rather, the exemplary embodiments are provided so that this disclosure will be thorough and complete, and will fully convey the concept of the inventive concept to those skilled in the art. The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another. As used herein, the term "and/or" includes any and all combinations of one or more of the associated listed items. Expressions such as "at least one of," when preceding a list of elements, modify the entire list of elements and do not modify the individual elements of the list.

Figure 1:
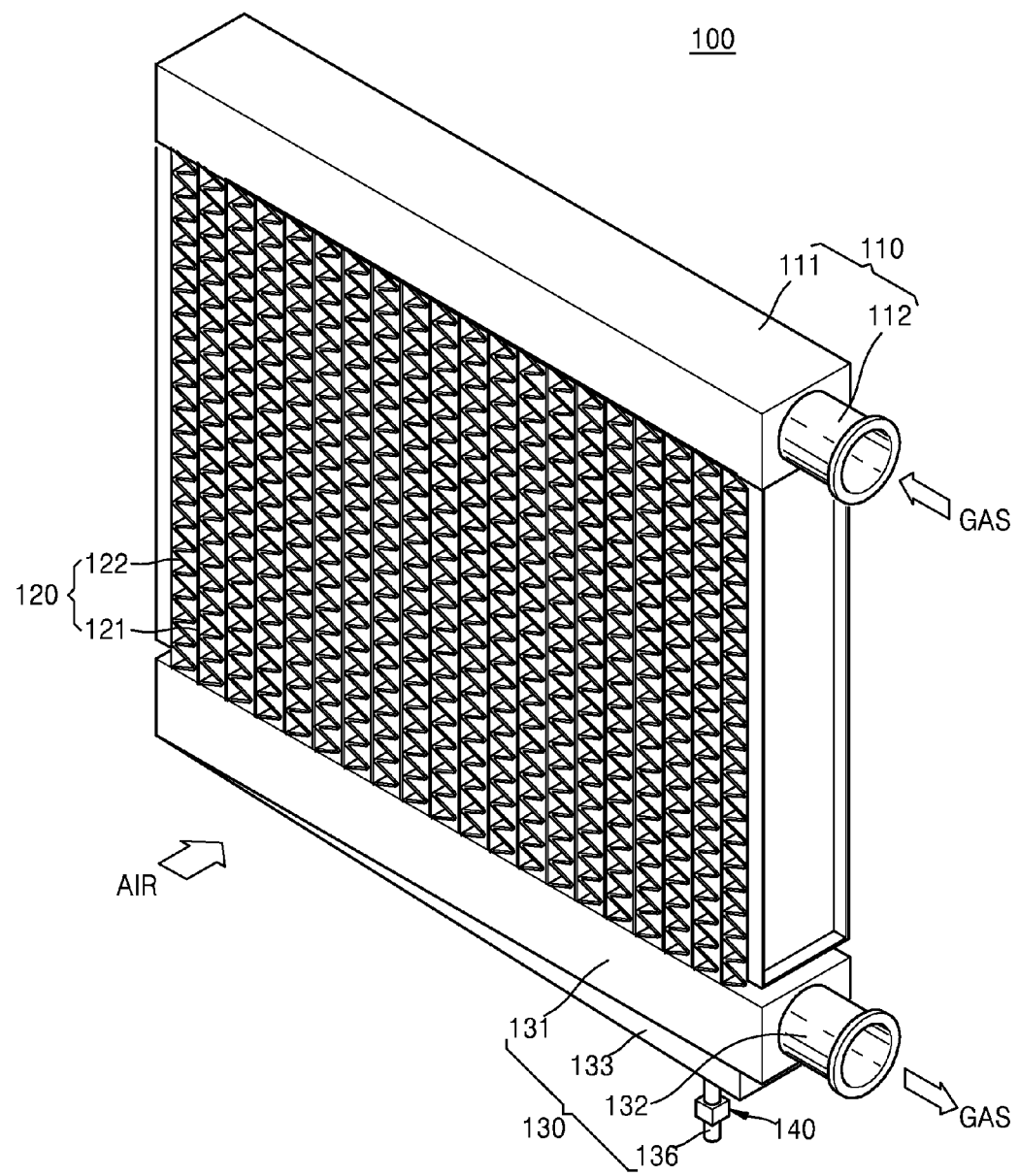
FIG. 1 is a perspective view illustrating a separator according to an exemplary embodiment.
Figure 2:
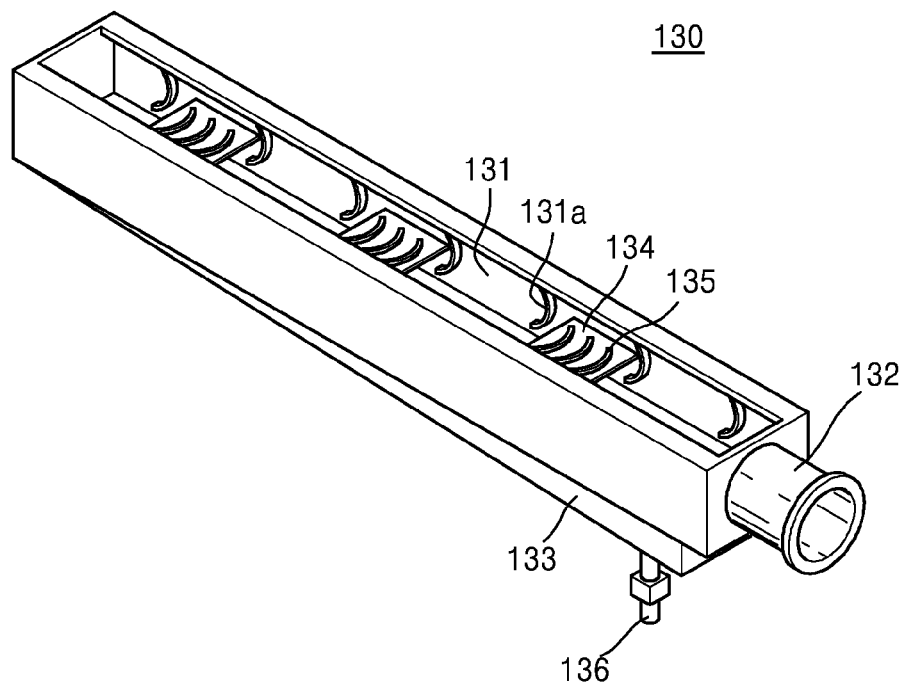
FIG. 2 is a perspective view illustrating a second header of FIG. 1 according to an exemplary embodiment.
Figure 3A:
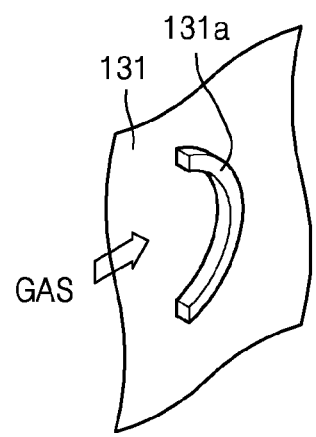
FIGS. 3A to 3D are perspective views illustrating various exemplary embodiments of a first baffle of FIG. 2.
Figure 3B:
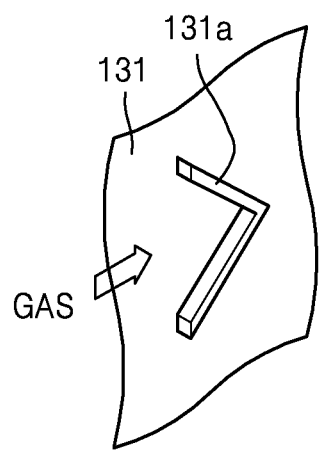
Figure 3C:
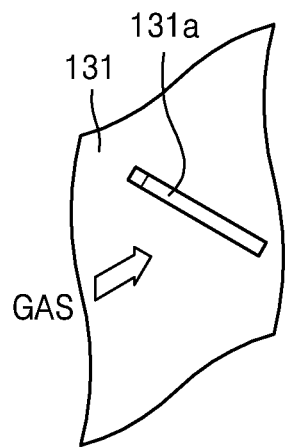
Figure 3D:
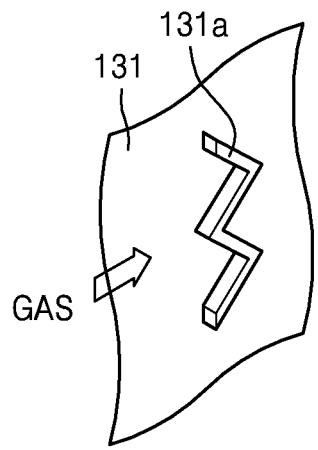
Figure 4:
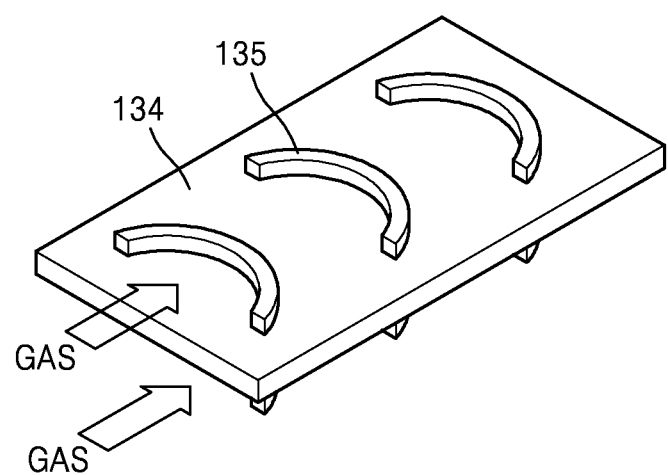
FIG. 4 is a perspective view illustrating a blocking plate of FIG. 2 according to an exemplary embodiment.

FIG. 1 is a perspective view illustrating a separator 100 according to an exemplary embodiment. FIG. 2 is a perspective view illustrating a second header 130 of FIG. 1 according to an exemplary embodiment. FIGS. 3A to 3D are perspective views illustrating various exemplary embodiments of a first baffle 131a of FIG. 2. FIG. 4 is a perspective view illustrating a blocking plate 134 of FIG. 2 according to an exemplary embodiment.

Referring to FIGS. 1 to 4, the separator 100 may include a first header 110, a core 120, and the second header 130.

The first header 110 may include an inlet 112 into which gas flows from the outside (i.e., an exterior of the separator 100). The first header 110 may include a first body unit 111 that is connected to the inlet 112, open on one side, and has an inner space. The first body unit 111 may have various shapes. For example, the first body unit 111 may be shaped as a cuboid, a triangular prism, or a cylinder. The first body unit 111 may transmit the gas that enters through the inlet 112 to the core 120.

The core 120 may include at least one cooling plate 121. At least one flow path may be formed inside the cooling plate 121. An end of the cooling plate 121 may be completely inserted in the inner space of the first body unit 111. A flow path in the cooling plate 121 may be connected with the inner space of the first body unit 111 so that the gas in the first body unit 111 may flow through. The flow path may be curved. For example, the flow path may be formed in a serpentine shape protruding in a direction perpendicular to a vertical direction of the cooling plate 121.

The cooling plate 121 may be formed of a plurality of cooling plates, and the plurality of cooling plates 121 may be separated from one another. The core 120 may include a fin 122 between adjacent cooling plates 121. The fin 122 may be curved and have protrusions on an outer surface thereof.

The cooling plates 121 may be perpendicularly connected to the first header 110. The cooling plates 121 may be connected to the first body unit 111. Therefore, the gas may enter through the inlet 112, flow into the first body unit 111, distributed to each flow path from the first body unit 111, and thus supplied to the second header 130 via the flow paths.

The second header 130 may include a second body unit 131 that is connected to the core 120, open on one side, and has an inner space. The second header 130 may include an outlet 132 that is connected to the second body unit 131 and guide the gas inside the second body unit 131 (i.e., an interior of the separator 100) to the outside (i.e., the exterior of the separator 100). Also, the second header 130 may include a condensate receiver 133 that is connected to the second body unit 131 and formed to an inclined bottom surface. More specifically, the condensate receiver 133 may be inclined along a gas flowing direction. For example, the condensate receiver 133 may be formed such that an upstream portion is higher than a downstream portion with respect to the gas flowing direction such that condensate may be collected at the downstream portion. The condensate receiver 133 may form a bottom portion of the second header 130. The second header 130 may include the blocking plate 134 that is disposed in the second body unit 131.

The second body unit 131 may be formed by using the same or a similar design as the first body unit 111. Also, the second body unit 131 may be formed such that a portion of the core 120 and a portion of each of the cooling plates 121 are inserted into the second body unit 131. The flow path of each of the cooling plates 121 may be connected to an inner space of the second body unit 131.

At least one first baffle 131a may be formed at an inner wall of the second body unit 131. That is, the at least one first baffle may be formed as a protrusion protruding from the inner wall of the second body unit. The first baffle 131a may have various shapes. For example, the first baffle 131a may be formed as a straight bar. The first baffle 131a may form a certain angle with a gas flowing direction in the second body unit 131. For example, the first baffle 131a may form a right angle with the gas flowing direction in the second body unit 131. Alternatively, the first baffle 131a may form an acute or an obtuse angle with the gas flowing direction in the second body unit 131.

The first baffle 131a may have at least one bending portion. Specifically, the bending portion of the first baffle 131a may be formed protruding toward the downstream direction with respect to the gas flowing direction in the second body unit 131. That is, the first baffle 131a may be extending from the upstream portion to the downstream portion with respect to the gas flowing direction. For example, the first baffle 131a may be shaped as the letter "V." Alternatively, the first baffle 131a may be shaped as the letter "U" or "W." The first baffle 131a may be formed as a portion of a semicircle or an oval. The first baffle 131a is not limited to the shapes described above, and may be formed in any shape having at least one bending portion for partially hindering gas flow and temporarily storing the gas.

The condensate receiver 133 may be connected to the second body unit 131. The condensate receiver 133 may accumulate the condensate created by the first baffle 131a to a certain region. The condensate receiver 133 may be connected to a lower portion of the second body unit 131 so as to store the condensate that falls due to its own weight.

The condensate receiver 133 described above may be formed such that a lower surface thereof is inclined toward a specific area. For example, the lower surface of the condensate receiver 133 may be formed such that a central portion is lower than other end portions. Alternatively, the lower surface of the condensate receiver 133 may be formed such that a portion nearest to the outlet 132 is lower than other portions. A portion that is the lowest among the lower surface of the condensate receiver 133 may be connected to other portions to form a downward slope. The condensate may be accumulated toward the lowest portion among the lower surface of the condensate receiver 133 along the slope. Hereinafter, an example in which the bottom surface of the condensate receiver 133 is inclined such that the portion nearest to the outlet 132 is the lowest and portions farther away from the outlet 132 increases in height will be described for convenience of description.

The blocking plate 134 may be disposed in an inner space of the second header 130. The blocking plate 134 may be placed in various ways. For example, the blocking plate 134 may be disposed across the inner space of the second body unit 131. In this case, the blocking plate 134 may be in parallel to a lengthwise direction of the second body unit 131 (i.e, the flow direction of the gas). Also, the blocking plate 134 may be disposed to form an acute angle with the lengthwise direction of the second body unit 131 (i.e, the flow direction of the gas). In particular, with respect to the gas flow direction, the blocking plate 134 may be disposed such that an upstream portion of the blocking plate 134 may be closer to the bottom portion of the second header 130 than a downstream portion of the blocking plate 134.

A second baffle 135 may be formed on at least one surface of the blocking plate 134. For example, the second baffle 135 may be provided on an upper surface and/or a lower surface of the blocking plate 134. The second baffle 135 may be formed by using the same or a similar design as the first baffle 131a. Hereinafter, an example in which the second baffle 135 is provided in the upper and lower surfaces of the blocking plate 134 will be mainly described, for convenience of description as shown in FIG. 4.

The separator 100 may further include a flow controlling unit 140 that is provided on the condensate receiver 133. A condensate guide unit 136 for guiding the stored condensate to the outside may be provided on the condensate receiver 133.

The flow controlling unit 140 may be, for example, a valve or an auto-trap. The flow controlling unit 140 may be any type of structure or device that may be provided on the condensate guide unit 136 and automatically or manually open and close the condensate guide unit 136. When the flow controlling unit 140 has an automatic opening and closing structure, the flow controlling unit 140 may be operated when the condensate in the condensate receiver 133 reaches a certain amount.

Operations of the separator 100 will be described below. The separator 100 may be provided in a gas inlet of a fluid machine or apparatus using gas. The fluid machine or apparatus may be any type of apparatus using gas, for example, a compressor, a boiler, a turbine, or an engine.

The inlet 112 of the separator 100 may be connected to an external gas source, and the outlet 132 of the separator 100 may be connected to the fluid machine or apparatus.

When the external gas source or the fluid machine is operated, the gas may flow into the first body unit 111 via the inlet 112. Then, the gas may be supplied to the flow paths in the cooling plates 121 which are connected to the first body unit 111, and thus supplied into the second body unit 131. A temperature of the gas may decrease as the gas moves through the flow paths and exchanges heat with air outside the cooling plate 121. In this case, an air flow unit (not shown) may be additionally provided around the cooling plates 121 to forcibly circulate the air around the cooling plate 121. The air flow unit may include a fan and a motor. The air flow unit may circulate the air around the core 120 such that the air moves between the cooling plates 121 of the core 120. For example, the air flow unit may circulate the air in a vertical direction along the core 120 from a direction perpendicular to a surface formed by the core 120. Also, the air flow unit may circulate the air in the direction perpendicular to the surface formed by the core 120.

The gas having a lower temperature may pass through the second body unit 131 and thus emitted via the outlet 132. Inside the second body unit, the gas collide with the first baffle 131a, the blocking plate 134, and the second baffle 135 in the second body unit 131, and thus, moisture inside the gas may be condensed. At least one selected from the first baffle 131a and the second baffle 135 may reduce a moving speed of the gas that flows inside the second body unit 131. That is, at least one selected from the first baffle 131a and the second baffle 135 may cause more amount of condensate to be created by causing the gas to remain inside the second body unit 131 for a long time.

The condensate may fall along outer surfaces of the first baffle 131a, the blocking plate 134, and the second baffle 135 due to its own weight. The falling condensate may reach the condensate receiver 133 and be temporarily stored therein.

As described above, the condensate receiver 133 may be formed such that the lower surface thereof is inclined toward a specific/predetermined area, and thus the condensate may be gathered along the slope. The condensate may be stored in the lowest surface of the condensate receiver 133.

The above-described processes may be continuously executed while the fluid machine or apparatus is operating. Accordingly, the condensate may continue to be accumulated in the condensate receiver 133.

When a certain amount of condensate is accumulated, the flow controlling unit 140 may be operated to discharge the condensate to the outside along the condensate guide unit 136. Specifically, when the flow controlling unit 140 is a valve, a user may manually open the valve or set the valve to automatically operate after a certain time so as to open the condensate guide unit 136. Alternatively, when the flow controlling unit 140 is an auto-trap, the condensate guide unit 136 may be opened when a level of the condensate in the condensate receiver 133 is equal to or higher than a predetermined level. The condensate guide unit 136 may be closed when a level of the condensate in the condensate receiver 133 is lower than a predetermined level.

The separator 100 may effectively remove the moisture in the gas by including baffles. In particular, the separator 100 may supply the gas without moisture to a fluid machine or apparatus, and thus prevent the fluid machine or apparatus from having low efficiency or malfunctioning due to the moisture. Also, because the separator 100 may remove the moisture in the gas by using a simple and small structure, the separator 100 may be provided in a compact space, and thus manufacturing cost and time may be reduced.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A separator comprising: a first header into which gas flows from an exterior of the separator; a core connected to the first header and comprising at least one flow path configured to cool the gas flowing from the first header through the flow path; and a second header connected to the core and configured to guide the gas passing through the at least one flow path to the exterior of the separator, wherein the second header comprises: a plurality of baffle groups disposed sequentially inside the second header and configured to remove moisture from the gas; and a condensate receiver configured to form a bottom portion of the second header and accumulate condensate in an area, wherein a bottom of the condensate receiver is linearly inclined, and wherein one of the baffle groups comprises: a blocking plate disposed across an inner space of the second header; at least one first baffle disposed before and after the blocking plate on an inner wall of the second header and; and at least one second baffle provided on the blocking plate.

2. The separator of claim 1, wherein the second header comprises:
    a second body comprising:
        an opening provided on a first side of the second header; and
        the at least one first baffle provided on a second side of the second header.

3. The separator of claim 1, wherein the second baffle is configured to remove the moisture from the gas.

4. The separator of claim 1, wherein the second baffle configured to reduce a moving speed of the gas.

5. The separator of claim 1, wherein the blocking plate is inclined with respect to a gas flowing direction.

6. The separator of claim 5, wherein the blocking plate is inclined and a distance between the blocking plate and a bottom portion of the second header increases with respect to the gas flowing direction.

7. The separator of claim 1, wherein at least a portion of the second baffle is bent.

8. The separator of claim 1, wherein the first baffle is configured to reduce a moving speed of the gas.

9. The separator of claim 1, wherein the first baffle comprises at least one bending portion.

10. The separator of claim 1, wherein the second header comprises a condensate guide configured to guide the condensate in the second header.

11. The separator of claim 10, further comprising a flow controller provided on the condensate guide and configured to open or close the condensate guide.

12. The separator of claim 10, wherein the condensate guide is connected to a portion of the second header adjacent to an outlet of the second header.

13. The separator of claim 1, wherein the at least one first baffle protrudes from the inner wall of the second header and extends toward a downstream side of a flow direction of the gas in the second header.

14. The separator of claim 13, wherein at least one of the at least one first baffle has at least one of a U-shape, W-shape and a V-shape.

* * * * *